Oct. 30, 1962     C. R. FROETSCHNER     3,060,954
WATER LEVEL CONTROL
Filed June 8, 1959
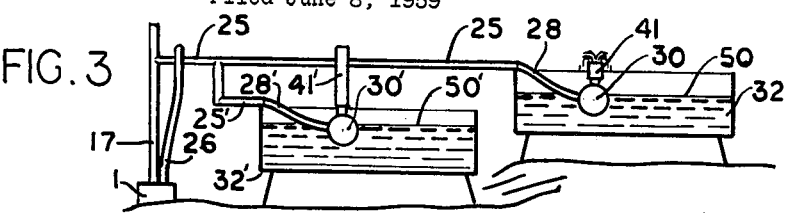
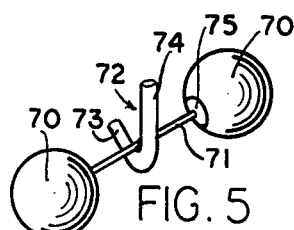
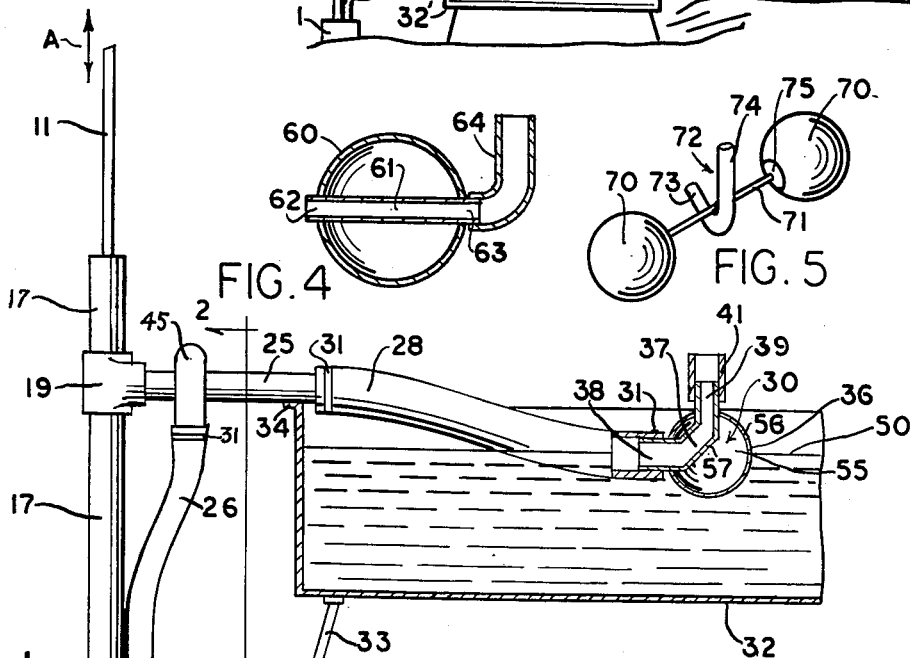
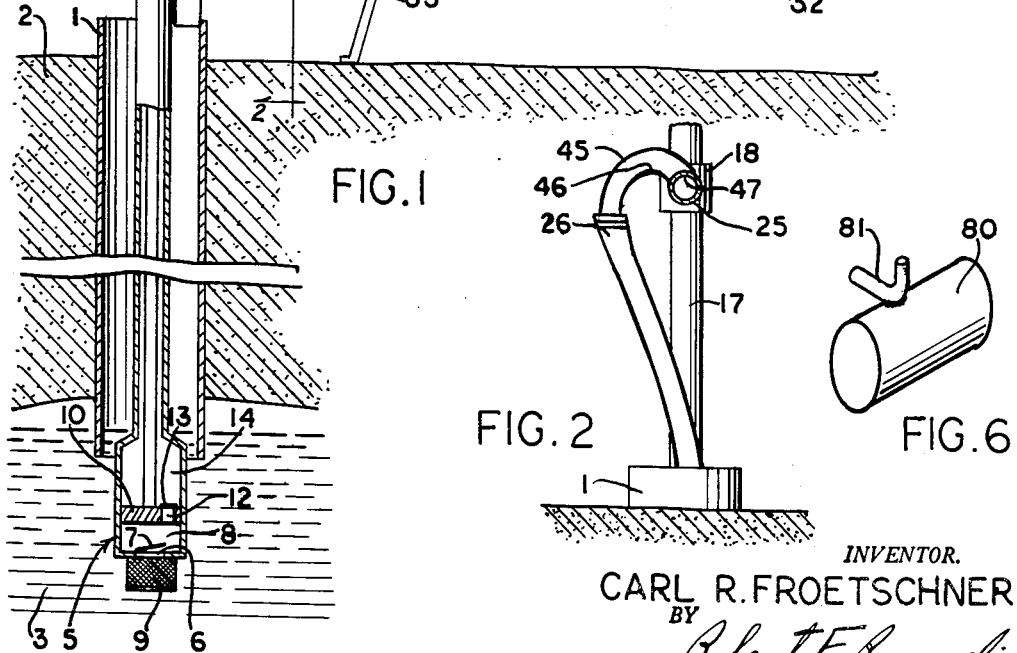
INVENTOR.
CARL R. FROETSCHNER
BY
Robert F. Ruemeli
ATTORNEY 3,060,954
WATER LEVEL CONTROL
Carl R. Froetschner, Offerle, Kans.
Filed June 8, 1959, Ser. No. 818,884
12 Claims. (Cl. 137—122)

This invention relates to an assembly for controlling the level of a fluid, and more particularly to controlling the water level in a stock watering tank in the absence of an outside source of power such as electricity.

Satisfactory general utility fluid level control devices usually require an extrinsic source of power and are usually subject to variable and adverse working conditions. For example, such devices should respond properly when subjected to variations in fluid pressure, variations in temperature, and various other external circumstances. Eventually such devices usually deteriorate because of corrosion or rusting of relative moving parts such as pivots, valves, guides, and so forth. Moving parts generally are subject to wear and invariably require adjustment of the fluid level control device, and eventually replacement of the parts. When an external source of power, usually electricity, is not readily available, it has been even more difficult to cope with the aforementioned factors. The most common approach is to rely on a shut-off valve actuated by a float and a cooperating mechanical linkage. Probably the most common use or this type of control is in the conventional toilet bowl water level control valve and float. Even under such protected circumstances such water level controls eventually require attention and most often replacement. The application of the subject invention to stock watering troughs or tanks is particularly important in range country where electricity is not readily available and pumps are actuated by windmills, or the like. The water level control device prevents the tank from overflowing and causing stagnant pools of water about the watering tank. Such stagnant pools of water tend to cause foot rot, a fungus growth in the hooves of cattle and an ailment which causes a substantial economical loss. Secondly, the subject water level control device conserves water since any water not utilized in filling the tank is returned to the source of supply. Although the present invention is described in conjunction with a stock watering trough supplied with water from a windmill actuated pump, various features of the invention are equally and fully applicable to other environments.

The water level control action is generally as follows: A float 30 has a discharge passage 37 with an outlet 39 and an inlet 38 connected by a flexible tube 28 to a supply pipe 25. The pipe has an intermediate outlet tube 45 with a fixed elevation 46 above the pipe. When the float outlet 41 is below the elevated intermediate outlet 45 in the pipe, water flows through the float outlet 41 and into a tank 32. When the float outlet 41 is above outlet 45 no water flows through the float outlet, but rather the water flows through the elevated intermediate outlet 45 and through a conduit 26 back to the source of supply 3.

It is therefore an object of this invention to provide an improved fluid control device.

Another object of this invention is to provide an improved fluid flow device which functions properly without an external source of power.

Still another object of this invention is to provide a fluid control device which is substantially constant in operation irrespective of the pressure of the fluid, or the temperature.

A further object of this invention is to provide a fluid control device which is substantially unaffected by wear.

A still further object of this invention is to provide an improved fluid control device which is devoid of any relative motion between contacting parts.

Further objects and advantages of this invention will be apparent from the following description and drawings in which:

FIGURE 1 is an elevation view partially in section and illustrating an embodiment of the invention.

FIGURE 2 is a sectional view taken on line 2—2 in FIGURE 1,

FIGURE 3 is a schematic elevation view illustrating an additional application of the invention, FIGURE 4 is an elevation sectional view illustrating an embodiment of a float, FIGURE 5 is a perspective view illustrating another embodiment of a float, and FIGURE 6 is a perspective view illustrating still another embodiment of a float.

Referring to the drawings, FIGURE 1 illustrates a general operational environment of the invention. A pump casing 1 passes through the ground 2 and opens into a pocket of water 3. A pump 5 has an inlet 6 with a check-valve 7 which opens to admit water to the pump inlet chamber 8 and closes to prevent its escape through the inlet 6. A filter screen 9 prevents foreign matter from entering the pump. A pump plunger or piston 10 is secured to a reciprocating pump drive rod 11. The reciprocating pump rod 11 moves up and down as indicated by the arrow A. The pump rod may be actuated in any suitable manner, and in the environment shown it would normally be actuated by a windmill. The pump piston 10 has an inlet 12 with a check-valve 13 which permits the passage of water through the inlet 12 and into the outlet chamber 14 but prevents a first conduit in the form of a reverse flow of water through the inlet 12. The pump discharges into a suction pipe 17 passing through the casing 1.

A second conduit including a supply pipe 25 is received by a T connection 19 in suction pipe 17. An elbow-shaped return conduit 45 communicates with the pipe 25 intermediate its ends. A return conduit 26 is secured to the free end of return conduit 45 and opens into the casing 1. Conduit 26 is preferably flexible to more readily absorb vibrations and to facilitate installation. The pipe 25 is preferably rigid, although it may be formed of flexible tubing or the like, and is preferably horizontal, but may be inclined. Secured to the discharge end of the pipe 25 is a flexible conduit or tube 28 having a discharge end terminating in a float assembly 30. The flexible hoses 26 and 28 may be connected to the float assembly and to the pipe 25 in any conventional manner suitable for forming a water-tight connection. As shown, hose clamps 31 are utilized. However adhesives or other means may also be utilized. The float assembly 30 is received in a stock watering tank or container 32 which is supported on the ground by legs 33. The pipe 25 is illustrated resting on an out-turned flange 34 on top peripheral and edge of the container 32. If desired the pipe 25 may be fixed to the flange 34 as by a U-bolt passing around the pipe and through holes in the flange 34 and secured by nuts but it must not be so tight as to resist vibration. Also if desired the pipe may be spaced from the flange 34 by a resilient seat block for absorbing vibrations.

The float mechanism 30 as illustrated in FIGURE 1, comprises a cylinder 36, a conduit 37 passing through the cylinder and having an inlet nipple 38 and a discharge nipple or nozzle 39. The conduit 37 preferably passes through the cylinder midway between its ends and a conventional water-tight seal is provided between the conduit 37 and the cylindrical wall of the float 36. In the event that the float is fabricated from brass or copper, the parts may be soldered or brazed. An adjustable nozzle outlet 41, which may be a piece of flexible hose, as hose 28, is telescopically received on the outlet nozzle 39 for a purpose to be more fully described hereinafter.

FIGURE 2 shows a side view of the return pipes 26 and 45. The elbow bend 45 has the uppermost point 46 of its lower wall substantially even with, or slightly above, the upper portion 47 of the supply pipe 25, as will be more fully described hereinafter.

In the environment shown in FIGURE 1, the casing 1 is four to six inches inside diameter, the suction pipe 17, supply pipe 25, return pipes 26 and 45, and the float conduit 37 are one and a quarter inch inside diameter, and the flexible hose 28, and the adjustable outlet nozzle 41 are about one and a half inch inside diameter or of such size as to properly fit the respective adjacent connecting members. The float 30 may be a copper or brass cylinder about six and a half inches in diameter and seven and a half inches in length. The float outlet 39 may be much smaller than float inlet 38, if desired, or about one inch inside diameter, or even less. These dimensions may vary depending on the quantity of water required, and are set forth merely as an illustration of one successful installation. Normal pump capacity is one to ten gallons per minute.

Referring to FIGURE 3, the invention is applied to two stock watering tanks, and additionally, the watering tanks are at different elevations. In FIGURE 3 similar reference numerals refer to similar parts illustrated in FIGURE 1. In addition, the supply pipe 25 is provided with a branch 25' terminating in a flexible conduit 28' which in turn terminates in a float assembly 30' having a telescopically received adjustable outlet nozzle 41', all similar to corresponding parts previously described.

The tanks, or containers, 32 and 32' both contain water having a level 50 and 50', respectively.

The operation is as follows: Referring again to FIGURE 1, during operation of the pump 5 the suction pipe 17 is constantly filled with water. The supply pipe 25 and the flexible tube 28 are also normally filled with water as is the tube 37 passing through the float 30, and the telescopic nozzle 41. The adjustable nozzle 41 is adjusted on the nozzle 39 so that when a desired predetermined water level 50 in tank 32 has been attained the top of the adjustable nozzle 41 will be even with or slightly above the point 46 of the elbow 45. When the desired predetermined level 50 of the water in tank 32 has been attained no substantial amount of water will flow out of the nozzle 41 but rather the water will flow through the return pipe 26 and back through the casing 1 to the source of supply 3. Therefore, no water is wasted. When the level 50 of the water in tank 32 drops the float assembly 30 also drops and the top of the adjustable nozzle 41 is then below the point 46 in the return pipe 26 so that water flows out of the nozzle 41. If desired, the outlet 39 may be lengthened and the nozzle 41 eliminated. It should be noted that there is no movement between parts of the control, and the only movement is entirely within the flexible tube 28. All of the remaining parts are devoid of any relative motion. It should also be noted that the flexible tube 28 does not kink or otherwise resist the pressure of the water. The flow of water through the adjustable outlet nozzle 41 is controlled by the relative head of water at the outlet 41 and at the point 46 in the return pipe 26. In other words, the level 50 of the water in tank 32 is controlled by the two outlets for the water, namely return pipe 26 and the outlet in the adjustable nozzle 41. The water normally always flows through pipe 26, and the level is therefore slightly above point 46, and through outlet 41 only when it is lower than point 46. The action is unaffected by the pressure of the water in suction pipe 17, the temperature of the water, or external conditions.

In the modification of FIGURE 3 the operation is precisely the same as in FIGURE 1. Each tank maintains its own desired predetermined water level 50 or 50', as previously described with respect to FIGURE 1. In the embodiment shown in FIGURE 3 the float 30' in the lower tank 32' has a longer adjustable nozzle 41' so that the same relationship exists between the top of the open end of the nozzle 41' and the point 46 in the return pipe 26. Similarly, the top of nozzle 41 maintains the relationship previously described. As shown in FIGURE 3, the water level 50 in the tank 32 is below the desired level and the float has dropped and water is flowing through the outlet in the nozzle 41. In tank 32' the water level 50' is at the desired level, the float is elevated so that the top of nozzle 41' is substantially even with or above the point 46 in the return pipe 26.

With particular reference to float 30, in FIGURE 1, a cylindrical float is illustrated. The float has circular or hemispherical ends 55 and a cylindrical side wall 56. The tube 37 has a mid-portion at a bevel of about 45° connecting the inlet nipple 38 and the outlet nipple 39. The tube 37 should be inserted midway between the ends 55. The telescopically received adjustable nozzle 41 may be any type of a tube, preferably a flexible tube such as an automobile radiator hose or the like. Once the adjustable nozzle 41 has been properly positioned on the nipple 39 it may be secured in place with a hose clamp, such as hose clamp 31, shown on the flexible tube 28.

FIGURE 4 shows a spherical float 60 having a straight pipe or tube 61 passing therethrough. One end 62 of the pipe 61 serves as an inlet and the opposite end 63 serves as an outlet, an elbow 64 is secured to the outlet end 63. This float may be easily improvised from a fishing net float or a swimming pool rope float merely by the addition of an elbow 64 which may be secured to the float in any suitable manner. If necessary, nipples 62 and 63 may be provided. Floats of this nature are often fabricated of plastic materials such as "Tenite" manufactured by Tennessee Eastman. A similar suitable float may be formed from a conventional cork float by inserting therethrough a pipe, such as pipe 61, and an elbow 64, or the inserted pipe may be formed with a right angle bend in lieu of elbow 64. If a cork float is used its outer surface may preferably be coated with a durable plastic or paint.

FIGURE 5 shows another embodiment of a float in which two spherical floats 70 are joined together by a rod or tube 71. Secured to the rod or tube is an elbow 72 having an inlet 73 and an outlet 74. A float of this type can be easily improvised by utilizing two toilet bowl floats 70, each having a conventional threaded connector 75 into which the pipe 71 may be threaded in a conventional manner. The elbow 72 may be secured to the pipe 71 in any conventional manner as by welding or soldering.

FIGURE 6 shows another embodiment of a float in which a sealed cylindrical container 80 has secured thereon an elbow 81. The elbow 81 may be secured in any conventional manner. This embodiment of a float may be simply improvised by utilizing an empty metal can having a conventional removable lid securely sealed and an elbow 81 attached as previously described. The elongated floats illustrated in FIGURES 1, 5 and 6 are more stable and resist tilting transverse to the longitudinal axis of the flexible hose 28.

All embodiments of the floats may be fabricated of any suitable material depending in part on their operating environment, and all may be provided with an adjustable telescopically received nozzle, as nozzle 41 in FIGURES 1 and 3. The invention is described in relationship to stock watering tanks; however it is equally applicable to controlling the fluid level in tanks of acid, alkali, boiling liquids, or any other environment, and it is particularly advantageous in that there are no relatively moving parts, because all of the parts which contact the liquid or the atmosphere around the liquid may be coated with a resistant material, and because of the lack of relative movement of the parts of the coating will deteriorate only because of the direct action of the material in which it is immersed.

The flexible hose 28 should be of such material that the float will not move about from side to side or fore and aft in the tank. As applied to stock watering troughs a relatively flexible automobile radiator hose 28 is suitable. Such a hose will prevent the float 30 from moving toward the suction pipe 17 and when the hose is securely fastened to the supply pipe 25 and the inlet nipple 38 on the float it will tend to prevent the float from tipping from side to side. It is also desirable that the hose 28 be of such a nature that it will not collapse, kink, or sag substantially because of the weight of the liquid within the hose.

Referring again to the return pipe 26, as illustrated in the drawings, the point 46 on the elbow 45 should be fixed in elevation with respect to the desired predetermined water level 50 in the tank 32. Of course, the water level in the tank can be controlled by varying the elevation of the point 46, that is, by providing a means for raising or lowering the point 46. This may be accomplished by connecting the return pipe 26 to the supply pipe 25 by means of a conventional T with the leg of the T inclined upwardly so that the inclination of the leg may be increased or decreased to properly position the point 46. It should again be noted that the point 46 is the highest point in the lower wall of the return pipe 26 and that the point 46 should be at the same elevation as, or above, the top of supply pipe 25. In a practical sense, if the point 46 is below the top of supply pipe 25 there will be a reduction in the effective capacity of the pipe 25, and the head will be more variable, an excessive amount of water will return through the pipe 26 to the casing 1 when the tank is filling. If the point 46 is of the same elevation as the bottom of pipe 25, or below, the water will normally tend to return entirely through the pipe 26, rather than flowing out of the nozzle 41, since the nozzle 41 could then not be adjusted properly, and any control of the flow of water into the tank 32 would depend on the pressure of the water in pipe 25, rather than on the relative elevation of the head of water in nozzle 41 and point 46 in the return pipe 26.

Although this invention has been described with particular reference to certain embodiments, structural details, materials, and particular modes of operation, various changes and modifications will be apparent to one skilled in the art, and the invention is therefore not to be limited to such embodiments, structural details, materials, or particular modes of operation, except as set forth in the appended claims.

I claim:

1. A fluid control assembly comprising: a container for a fluid, a source of supply of fluid at a lower elevation than said container, means for conveying said fluid from said source of supply to said container, said means including conduit means, said conduit means having a first discharge portion with an overflow level, means for returning said fluid passing through said first discharge portion to said source of supply, said conduit means having a second discharge portion with an overflow level variable in elevation above and below the first said overflow level, and means to vary the overflow level of said second discharge portion above and below the overflow level of said first discharge portion responsive to variation in the level of said fluid in said container.

2. A fluid control assembly, comprising: a container for a fluid, a source of supply of fluid at a lower elevation than said container, means for conveying said fluid to said container, said means including conduit means for said fluid, said conduit means having a first discharge portion and a second discharge portion variable in elevation above and below said first discharge portion, means to vary the elevation of said second discharge portion responsive to variation in elevation of said fluid in said container, and means to divert flow of said fluid from said second discharge portion through said first discharge portion and to said source of supply in response to said second discharge portion being elevated above said first discharge portion.

3. A fluid control assembly comprising: a container for a fluid, a source of supply of fluid at a lower elevation than said container, means for conveying said fluid to said container, said means including a generally horizontal tube, said tube having a first discharge portion with an overflow level, said tube having a generally straight flexible portion of substantial length and a second discharge portion with an overflow level variable in elevation above and below the first said overflow level, said second discharge portion being spaced from said first discharge portion by said flexible portion of said tube, said discharge portions extending upwardly from said tube, and means to move said second discharge portion and vary the elevation of its overflow level above and below the elevation of the first said overflow level responsive to variation in the level of said fluid in said container.

4. In the fluid control assembly of claim 3, the last said means comprising a float secured to said flexible portion of said tube adjacent said second discharge portion.

5. A fluid control assembly comprising: a source of supply of a fluid, conduit means for conveying said fluid from said source of supply, said conduit means having a first discharge portion with an overflow level and a second discharge portion with an overflow level variable in elevation above and below the first said overflow level, said conduit means having a flexible portion, said second discharge portion being spaced from said first discharge portion by said flexible portion, said flexible portion having opposite ends, one of said ends being fixed with respect to said first discharge portion and the other of said ends being fixed with respect to said second discharge portion, and a float fixed with respect to said second discharge portion, whereby said assembly is devoid of any interengaging moving parts.

6. In a watering system for use in conjunction with a subterranean water supply, a subterranean pump having an inlet for the water, a first conduit extending upwardly through the ground from said pump, a windmill, means responsive to operation of said windmill for driving said pump, a watering tank, a second conduit connected with said first conduit and having a pair of outlets, a return conduit connected with one of said outlets for returning water to said water supply, said return conduit having a portion defining an overflow level, another conduit opening into said tank for controlling the flow of water from said water supply into said tank and the level of water in said tank, and means controlling said other conduit to recirculate water from said water supply through said return conduit when the level of water in said tank is at a predetermined level and to divert water from said return conduit into said tank when the water level of said tank drops below said predetermined level.

7. In a watering system, a water supply, a pump having an inlet for the water, a pump suction pipe extending from said pump for pumping water from said water supply, a windmill, a drive rod actuated responsive to operation of said windmill and telescoped within said suction pipe and operatively connected with said pump for pumping water through said suction pipe at varying quantities depending on the speed of operation of the windmill, a watering tank, a second pipe connected with said suction pipe, said second pipe having a pair of outlets, a return conduit connected with one of said outlets and extending upwardly from said second pipe for returning water from said pipe to said water supply, said conduit having an elevated lower wall defining an overflow level, a flexible conduit having opposite ends, one of said ends being connected with the other of said second pipe outlets, a float in said tank, a float conduit connected with said float and having an inlet portion and an upwardly extending outlet portion, said inlet portion being connected with the other end of said flexible conduit, said outlet portion having an upper end defining an overflow level whereby water is recirculated from said water supply through said return conduit when said float conduit overflow level is above the overflow level of said return conduit, and when said float conduit overflow level is below the overflow level of said return conduit a portion of the water normally flowing through said return conduit being diverted into said tank.

8. In a watering system for use in conjunction with a subterranean water supply and operable in range country in the absence of an extrinsic source of power such as electricity, a subterranean pump having an inlet for the water, a casing extending upwardly through the ground from said pump, a pump suction pipe extending upwardly within said casing and from said pump for pumping water from said water supply, a windmill, a drive rod actuated responsive to operation of said windmill and telescoped within said suction pipe and operatively connected with said pump for pumping water through said suction pipe in varying quantities depending on the speed of operation of the windmill, a watering tank, a generally level pipe connected with said suction pipe above the ground for the flow of water from said suction pipe into said tank, said generally level pipe having a pair of outlets, a return pipe connected with one of said outlets and extending upwardly from said generally level pipe and opening into said casing for returning water from said generally level pipe to said water supply, said return pipe having an elevated lower wall defining an overflow level, means mounting said generally level pipe with the other of said outlets stationary with respect to said tank, a generally straight and substantially horizontal flexible tube having opposite ends, one of said tube ends being connected with the other of said generally level pipe outlets, a float in said tank, a float conduit secured to said float and having a generally horizontal inlet portion and an upwardly extending outlet portion, said inlet portion being connected with the other end of said flexible tube whereby said flexible tube is effectively straight and generally horizontal, an upwardly extending nipple telescopically adjustable on said float conduit outlet portion and having an upper outlet end defining an overflow level adjustable with respect to the first said overflow level for controlling the flow of water from said water supply into said tank and the level of water in said tank, whereby water is recirculated uncontaminated from said water supply through said suction pipe and return pipe back to said water supply when the level of water in said tank is such that the nipple outlet is above the overflow level of said return conduit, and when the water level of said tank drops, the nipple outlet is below the overflow level of said return conduit and a portion of the water normally flowing through said return pipe is diverted into said tank.

9. An article of manufacture for handling a fluid and adapted for use with a container for the fluid and a source of supply of fluid at a lower elevation than the container, comprising: a conduit having an inlet opening adapted to be connected with said source of supply and a pair of upwardly facing discharge openings on the same side of said conduit, said conduit having a flexible portion, and said discharge openings being spaced apart by said flexible portion, and a float on said flexible portion near one of said openings and adapted to be received in said container, and the other discharge opening being adapted to be connected for discharge of fluid into said source of supply.

10. An article of manufacture for controlling the level of a fluid in a container and adapted for use with a source of supply of the fluid at a lower elevation than the container, comprising: a tube having relatively rigid and flexible portions, said tube having an inlet opening adapted to be connected with said source of supply and a pair of discharge portions extending upwardly from said tube, one of said discharge portions extending from said rigid portion and adapted to be connected for discharge of fluid into said source of supply, said discharge portions being spaced apart by said flexible portion of said tube for movement of the other discharge portion with respect to said one discharge portion, and a float on said flexible portion near said other discharge portion and adapted to be received in said container.

11. An article of manufacture for controlling the level of a fluid in a container and adapted for use with a source of supply of the fluid at a lower elevation than the container, comprising: a tube having a flexible portion of substantial length and three openings into said tube, two of said openings being on the same side of said tube and spaced apart by said flexible portion, and buoyant means on said flexible portion and adapted to be received in said container for varying the elevation of one of said two openings with respect to the other of said two openings, the other of said two openings being adapted to be connected for discharge of fluid into said source of supply, and the third of said openings being an inlet adapted to be connected with said source of supply.

12. An article of manufacture for controlling the level of a fluid in a container and adapted for use with a source of supply of the fluid at a lower elevation than the container, comprising, a tube having a flexible portion of substantial length and three openings into said tube, two of said openings being spaced apart by said flexible portion of said tube, one of said two openings being adapted to be positioned for discharge into said container, the other of said two openings being adapted to be connected for discharge of fluid into said source of supply, and the third of said openings being an inlet adapted to be connected with said source of supply.

References Cited in the file of this patent

UNITED STATES PATENTS

| | | |
|---|---|---|
| 321,626 | Moore | July 7, 1885 |
| 1,203,578 | Brooks | Nov. 7, 1916 |
| 2,274,678 | Eliason | Mar. 3, 1942 |

FOREIGN PATENTS

| | | |
|---|---|---|
| 17,307 | Great Britain | Aug. 8, 1904 |
| 100,941 | Sweden | Feb. 25, 1941 |
| 1,061,193 | France | Nov. 25, 1953 |